United States Patent [19]

Takahashi

[11] 4,126,593

[45] Nov. 21, 1978

[54] RESIN COMPOSITION OF IMPROVED FLAME RETARDANCY AND MOLDABILITY

[76] Inventor: Hiroshi Takahashi, 46-17, Izumi 4-chome, Suginami-ku, Tokyo-to, Japan

[21] Appl. No.: 733,109

[22] Filed: Oct. 18, 1976

[30] Foreign Application Priority Data

Oct. 18, 1975 [JP] Japan ............................ 50-125762
Mar. 10, 1976 [JP] Japan ............................ 51-25959

[51] Int. Cl.$^2$ ........................... C08J 3/20; C08J 5/06; C08J 5/10
[52] U.S. Cl. ........................... 260/23 R; 106/15 FP; 260/23.7 M; 260/42.14; 260/DIG. 24
[58] Field of Search ........... 106/308 F, 308 Q, 15 FP, 106/18; 260/DIG. 24, 42.14, 23 R, 23.7 M

[56] References Cited

U.S. PATENT DOCUMENTS

| | | | |
|---|---|---|---|
| 238,341 | 3/1881 | Bunnell | 106/18 |
| 2,211,796 | 8/1940 | Schneider | 106/308 F |
| 2,290,914 | 7/1942 | Machlin | 106/308 F |
| 2,489,228 | 11/1949 | Rudd | 106/18 |
| 3,006,873 | 10/1961 | Taylor | 260/42.14 |
| 3,090,763 | 5/1963 | Hillier | 260/23 R |
| 3,252,810 | 5/1966 | Somers | 106/308 F |
| 3,592,940 | 7/1971 | Quesada | 106/308 F |
| 3,712,824 | 1/1973 | Kiyokawa et al. | 106/308 Q |
| 3,773,708 | 11/1973 | Takahashi et al. | 260/42.14 |
| 3,843,380 | 10/1974 | Beyn | 106/308 Q |
| 3,928,060 | 12/1975 | Smith et al. | 106/308 Q |
| 4,015,999 | 4/1977 | Robertson et al. | 106/308 Q |

Primary Examiner—Ronald W. Griffin
Attorney, Agent, or Firm—William J. Daniel

[57] ABSTRACT

An inorganic filler which comprises a powdery inorganic compound, such as calcium carbonate or magnesium hydroxide, coated with a fatty acid ester of a polyhydric alcohol. A synthetic thermoplastic resin composition which is excellent in moldability and flowing characteristics and is furnished with impact-strength, flame-retarding property, self-extinguishability and the like properties is obtained by incorporating a resin with the inorganic filler subjected to the above modification treatment.

9 Claims, No Drawings

RESIN COMPOSITION OF IMPROVED FLAME RETARDANCY AND MOLDABILITY

BACKGROUND OF THE INVENTION

The present invention relates to a novel inorganic filler and to a thermoplastic resin composition filled with same. More particularly, the present invention relates to an inorganic filler comprising a powdery inorganic compound coated with a fatty acid ester of a polyhydric alcohol as well as a synthetic thermoplastic composition comprising same.

From the past, a variety of powdery inorganic compounds are known as inorganic fillers for synthetic resins. As powdery inorganic compounds are generally hydrophilic at the surface thereof, they have poor affinity to hydrophobic or oleophilic synthetic resins and so cannot be incorporated in a large amount into such resins to significantly modify the physical properties of moldings obtained therefrom. As a method widely adopted hitherto for overcoming this drawback, such powdery inorganic compound is coated with a fatty acid or a metal salt thereof before actual use.

Since these known conventional coating agents have a low softening or melting point, they have such a shortcoming that they undergo pyrolysis and seriously reduce their covering characteristics when exposed under high temperatures.

As a result of extensive researches made for developing an inorganic filler of good quality which is devoid of such drawbacks and can be incorporated in a large amount into resins, it has now been found that the various problems can be solved by using as a filler a powdery or powdered inorganic compound coated with a fatty acid ester of a polyhydric alcohol and that the use of such inorganic filler serves to improve flowing characteristics and is especially effective for improving kneadability with resins so that various physical properties such as impact-strength of the resulting moldings can remarkably be improved and enhanced. The present invention has been accomplished on the basis of the above finding.

BRIEF SUMMARY OF THE INVENTION

In accordance with the present invention, therefore, there are provided an inorganic filler for synthetic thermoplastic resins which comprises a powdery inorganic compound coated with a fatty acid ester of a polyhydric alcohol, and a synthetic thermoplastic resin composition comprising the inorganic filler.

It is an object of the present invention to provide a new inorganic filler.

It is another object of the present invention to provide an inorganic filler coated with a coating agent having a high softening or melting point and excellent covering characteristics.

It is still another object of the present invention to provide an inorganic filler which can be incorporated in a large amount into a synthetic thermoplastic resin to afford a synthetic resin composition which is improved in flowing chracteristics and kneadability.

It is further object of the present invention to provide a synthetic thermoplastic resin composition improved in moldability, flowing characteristics, kneadability and impact strength.

It is still further object of the present invention to provide a flame-retarding synthetic thermoplastic resin composition.

It is still yet object of the present invention to provide a self-extinguishable thermoplastic resin composition which is excellent in moldability and appearance and has incorporated therewith an inorganic hydroxide of poor hygroscopic property.

Other and further objects, features and advantages of the invention will appear more fully from the following description.

DETAILED DESCRIPTION OF THE INVENTION

All of the inorganic compounds used in the prior arts as filler for synthetic resins can be used as the inorganic compound in the present invention.

Illustrative of such inorganic compound are, for example metal oxides such as titanium oxide, silica, alumina, magnesia and zinc oxide; metal hydroxides such as aluminum hydroxide and magnesium hydroxide; metal carbonates such as precipitated calcium carbonate, heavy calcium carbonate, magnesium carbonate and basic magnesium carbonate; metal sulfates and sulfites such as barium sulfate, calcium sulfite and chemical gypsum; metal sulfides such as zinc sulfide and cadmium sulfide; metal silicates and silicate minerals such as calcium silicate, magnesium silicate, kaolin, talc, agalmatolite, diatomaceous earth and asbestos; and calcium aluminate. All of these inorganic compounds are advantageously be used as starting material for the inorganic filler of the present invention but the inorganic compounds are properly selected according to the sorts of sythetic resins to be incorporated therewith or the intended purpose of the final composition. Of these inorganic compounds, magnesium hydroxide, aluminum hydroxide, calcium sulfite, gypsum, basic magnesium carbonate, kaolin and talc are most preferably used.

The inorganic filler of the present invention comprises a powdery or powdered inorganic compound as mentioned above which has been coated with a fatty acid ester of a polyhydric alcohol. This coating agent is superior in stability at high temperatures to one used in the prior arts. Usually used as the polyhydric alcohol constituting such excellent coating agent are alcohols having 2–6 hydroxyl groups, such as ethylene glycol, propylene glycol, glycerol, trimethylolpropane, pentaerythritol and dipentaerythritol. Of these polyhydric alcohols, those of the neopentyl series such as dipentaerythritol, pentaerythritol and trimethylolpropane are preferable in view of stability at high temperatures. On the other hand, a saturated fatty acid having 4–24 carbon atoms, preferably a saturated straight fatty acid having 8–18 carbon atoms or a mixture of acids having the above defined carbon atoms in average can advantageously be used as the fatty acid constituent. The fatty acid ester of the polyhydric alcohol involves, as will easily be understood from the structure, a complete ester wherein all of the hydroxyl groups in the starting polyhydric alcohol are esterified and a partial ester wherein a part of the hydroxyl groups is esterified. Although an almost same effect can be achieved by either one of these esters or a mixture of these esters, the use of a single ester corresponding to at least diester or a mixture of esters wherein the degree of esterification is at least diester in average is particularly preferable because of its good performance.

The inorganic fillers of the present invention can be manufactured economically from the above mentioned inorganic compounds and fatty acid esters of polyhydric alcohols without any special trouble according to an ordinary method for coating fine particles. For Example, the powdery inorganic compound can be coated with the ester either by emulsifying the ester as such or by the aid of an appropriate solvent and adding the emulsion to an aqueous suspension of the inorganic compound or by applying the ester alone or a solution of the ester in an appropriate solvent directly to the powdery inorganic compound. An optional method is selected according to the sort of inorganic compound but the use of a proper crasher where the inorganic compound and the ester or an emulsion or solution thereof are brought into contact with each other is advantageous for attaining pulverization and coating of the inorganic compound at the same time. The amount of the ester used varies according to the sort and particle size of the inorganic compound and the coating method adopted, but the ester need not be used in a large amount. The use of the ester in an amount of 0.5–5% by weight based on the inorganic compound is usually sufficient for coating the inorganic compound according to any one of the above mentioned coating methods to obtain an entirely coated inorganic filler of good quality.

Examples of resins to be incorporated with the inorganic filler include polyolefins such as high density polyethylene, low density polyethylene, polypropylene, polybutene-1, and copolymers composed predominantly of such polyolefins; polyvinyl chloride; polystyrene, polyacrylonitrile; and copolymers containing these polymers (ABS resin, AS resin, etc.) nylon; and polyesters. The filler of this invention is most effective for polyolefins among the above various resins.

Incorporation of these resins with the new filler of this invention can be carried out according to an ordinary kneading method, for example, a method wherein a roll mixer, Banbury mixer or biaxial extruder is used. As described before, the known conventional inorganic fillers reduces the flowing chracteristics kneadability and the like properties of resin composition and thus they cannot be incorporated in a large amount into resin with the exception of the case of using a special expensive filler. In the case of the filler of this invention, however, the above various properties are very excellent even in 40% by weight or more of filler concentration, and a resin composition can easily be obtained by incorporating a resin with the filler in a surprisingly large amount of at least 70% by weight. According to the present invention, thus, a suitable amount of the filler up to 95% by weight freely incorporated into resins according to the intended purpose. In case the concentration of the filler of this invention which is excellent in stability at high temperatures is increased in the resin composition, flame-retarding property or self-extinguishable property can be imparted to the resin composition or moldings manufactured therefrom.

Below is an explanation on a resin composition furnished with self-extinguishable property (self-extinguishable resin composition) as one example of the resin thermoplastic compositions of an increased filler content.

In recent years, a demand for flame-retarding household articles and construction materials tends to increase. The methods heretofore known for imparting flame-retarding property to thermoplastic resins include incorporation of the resins with antimony trioxide and a halide, blending of the resins with a vinyl chloride resin and copolymerization of the resins with vinyl chloride. However, all of these methods accompany evolution of a halogen gas formed by thermal decomposition of the resins at the time of molding and thus leave many problems to be solved, such as corrosion of molding machines, and metal molds and maintenance of hygienic environment for workers.

A method of incorporating resins with an inorganic hydroxide such as magnesium hydroxide and aluminum hydroxide was proposed for the purpose of overcoming drawbacks resulting from the use of such halide. This method imparts flame-retarding property to thermoplastic resins by utilizing water formed by pyrolysis of the inorganic hydroxide. This method may be advantageous in that no toxic gas is evolved and toxicity of the hydroxide itself is negligible. However, such inorganic hydroxide is highly hygroscopic so that the formation of silver streak which causes damage of appearance of moldings is unavoidable. In addition, application of such hydroxide to big size products is difficult because of the defect that the flowing characteristics is seriously reduced when the hydroxide is incorporated in an amount sufficient to impart flame-retarding property to the resin. The treatment of an inorganic hydroxide with a surface treating agent was also proposed to overcome the above drawbacks. However, such treatment rather reduced the flowing characteristics and finally resulted in damage of appearance of the resultant moldings or reduction of mechanical strength such as impact strength of the moldings. The present invention has overcome all of the above mentioned drawbacks.

More particularly a self-extinguishable resin composition improved in flowing characteristics and impact strength and overcoming all of the drawbacks in the known conventional compositions can be provided by incorporating 60–5% by weight of the above defined thermoplastic resin, especially the above-defined polyolefin with 40–95% by weight of the filler comprising an inorganic hydroxide, especially magnesium hydroxide the surface of which has been treated with the above defined fatty acid ester of the polyhydric alcohol. In this case, if the amount of the hydroxide powder is less than the above value, the flame-retarding effect will become unsatisfactory. On the other hand, if the amount of the thermoplastic resin is less than the above value, moldability of the composition will be bad. The amount of the hydroxide powder is preferably within a range of 40–70% by weight when the composition is used for the purpose where a high degree of fluidity is required, for example, injection molding. The amount of the hydroxide powder within a range of 60–95% by weight is appropriate when the composition is subjected to extrusion molding. Until now, it was practically impossible to incorporate a thermoplastic resin with an inorganic filler, especially magnesium hydroxide in a large amount of at least 70% by weight. However, the present invention makes it possible for the first time to incorporate the resin with such a large amount of the inorganic filler in practical use.

Base polymer constituting the self-extinguish composition in this invention can suitably be employed from the group of thermoplastic resin as mentioned above, among those polyolefin resin being most preferable in view of coat, moldability.

In case that rigidity and thermal resistance are required polypropylene, propylene-ethylene block copolymer and propylene-ethylene random copolymer are specifically recommended.

When such polypropylene series resin as above mentioned having comparatively high molding temperature is used, magnesium hydroxide having high decomposition temperature is most preferable and, in cooperation with the modification effect of pentaerythrytol ester, dipentaerythrytol ester or trimethylol propane ester having thermal resistance, there is provided the excellent self-extinguishable resin composition.

On incorporation of the filler of the present invention to the resin, various known conventional additives properly used according to the intended purpose, such as pigments, antioxidants, UV-absorbing agents, antistatic agents, neutrallizing agents and the like can also be incorporated without problems. A resin composition thus obtained which contains the filler of the present invention and any optional additive can be molded according to a usual method for molding.

In view of the foregoing explanation, it is evident that the present invention provides a new excellent inorganic filler for synthetic thrmoplastic resins and markedly contributes to high molecular industries and the fields of related industries.

To further illustrate this invention, and not be way of limitation, the following examples are given.

EXAMPLE 1

An aqueous emulsion of saturated straight fatty acid ester (concentration of ester: 10%) of pentaerythritol (main component: diester; chain length of the fatty acids: $C_{10}$–$C_{13}$) was added to a 5% aqueous suspension of calcium hydroxide at a rate of 1.5g/CaO 10g. Gaseous carbon dioxide was blown into the mixture for about 30 minutes to prepare an ester-coated calcium carbonate which was then collected by filtration, dried at about 50° C. and pulverized to yield an inorganic filler.

EXAMPLE 2

To a 12% aqueous suspension of calcium carbonate was added an aqueous emulsion to the ester (concentration of ester: 15%) used in Example 1 at a rate of 15g/$CaCO_3$ 100g. The mixture was stirred for about 15 minutes to prepare an ester coated calcium carbonate which was then dried and pulverized to yield an inorganic filler.

EXAMPLE 3

Into a solution of 10g of saturated straight fatty acid ester of pentaerythritol (main component: tetraester; chain length of the fatty acids: $C_{10}$–$C_{13}$) in 450ml of toluene were suspended heavy calcium carbonate (particle diameter: 30μ in average). The calcium carbonate was pulverized in a pot mill for about one hour to obtain an ester-coated calcium carbonate which was then dried at about 80° C. until toluene odor was no longer felt and pulverized to prepare an inorganic filler.

EXAMPLE 4

In 500ml of ethanol were dissolved 20g of the same ester as described in Example 3. Into this solution were dispersed 400g of magnesium hydroxide powder. The dispersion was subjected to a pulverizing treatment for about one hour in a pot mill to obtain an ester-coated magnesium hydroxide which was then dried at about 80° C. to prepare an inorganic filler.

EXAMPLE 5

In 350ml of toluene were dissolved 10g saturated straight fatty acid ester of pentaerythritol (main component: tetraester; chain length of the fatty acids: $C_{12}$–$C_{16}$). Into this solution were dispersed 500g of aluminum hydroxide powder. The dispersion was subjected to a pulverizing treatment for about 30 minutes in an oscillating mill to obtain an ester-coated aluminum hydroxide which was then dried at about 80° C. to prepare an inorganic filler.

EXAMPLE 6

Over 100g of kaolin was sprindled the same aqueous emulsion of fatty acid ester of pentaerythritol as described in Example 1 in an amount of 20% by weight. The mixture was thoroughly stirred in a heating mill to obtain an ester coated kaolin which was then dried at about 105° C. to prepare an inorganic filler.

EXAMPLE 7

Five grams of the same fatty acid ester of pentaerythritol as described in Example 3 were mixed with 200g of talc for about 2 hours in a mixer kept at about 120° C. to obtain an inorganic filler comprising an ester coated talc.

EXAMPLE 8

An aqueous emulsion of 10g of saturated straight fatty acid ester (concentration of ester: 10%) of trimethylolpropane (main component: triester; chain length of the fatty acids: $C_{14}$–$C_{18}$) was sprinkled over 500g of magnesium hydroxide powder. The mixture was thoroughly stirred in a heating mixer to obtain an ester coated magnesium hydroxide which was then dried at about 105° C. to prepare an inorganic filler.

The above described processes for preparing coated inorganic fillers are also applicable to inorganic fillers other then calcium carbonate, magnesium hydroxude, aluminum hydroxide, kaolin and talc as illustrated in Examples 1–8. From the results of UV-absorption spectrum analysis, differential thermal analysis, thermogravimetric analysis, chemical analysis and dip heat measurement, it was confirmed that the inorganic fillers were entirely coated with the fatty acid esters in any of the above processes.

EXAMPLE 9

The ester-coated calcium carbonate (ppt.) filler obtained in Example 1 (the amount of the coating ester: 1.5% by weight) was incorporated into polypropylene and the mixture was molded. The physical properties of the resulting moldings (a sheet of 0.5mm in thickness) and kneadability are shown in Table 1 in comparison with the cases of using a conventional stearic acid-coated calcium carbonate (ppt.) and untreated calcium carbonate (ppt.) as control.

Table 1

| Filler | Concentration of filler | Kneadability* (roll kneading time) | Bending modulus** (kg/$cm^2$) | Dynstat impact strength** (kg.cm/$cm^2$) |
|---|---|---|---|---|
| The ester-coated calcium carbonate (ppt.) | 40% by weight | 9.5 min. | 21,000 | 18 |
| | 60 | 18.5 | 28,500 | 20 |

Table 1-continued

| Filler | Concentration of filler | Kneadability* (roll kneading time) | Bending modulus** (kg/cm$^2$) | Dynstat impact strength** (kg.cm/cm$^2$) |
|---|---|---|---|---|
| Stearic acid-coated calcium carbonate (ppt.) | 40 | 15.0 | 18,100 | 8 |
| " | 60 | 25.5 | 31,600 | 10 |
| Untreated calcium carbonate (ppt.) | 40 | 20.5 | 20,500 | 6 |
| " | 60 | Impossible | — | — |

*Time required for homogeneously dispersing, in appearance, the filler into the resin in the case of kneading 500g of the composition with rolls
**Value for a sheet of 0.5mm in thickness

EXAMPLE 10

Results of measurements of (a) physical properties of a sheet of 0.5mm in thickness obtained by incorporating polypropylene with the ester-coated calcium carbonate (ppt.) filler obtained in Example 2 (the amount of the coating esters: 2.25% by weight) and (b) kneadability on incorporation of the filler are shown in Table 2.

Table 2

| Filler | Kneadability (roll kneading time) | Bending modulus | Dynstat impact-strength |
|---|---|---|---|
| 40% by weight | 8 min. | 18,500 kg/cm$^2$ | 19 kg.cm/cm$^2$ |
| 60 | 16 | 23,000 | 22 |

EXAMPLE 11

The physical properties of a sheet of 0.5mm in thickness manufactured from a composition comprising 70% by weight of the ester-coated heavy calcium carbonate obtained in Example 3 (the amount of the coating esters: 2% by weight) and 30% by weight of polypropylene are shown in Table 3 in comparison with the cases of using a conventional stearic acid-coated heavy calcium carbonate and untreated heavy calcium carbonate as control.

Table 3

| Filler | Bending modulus | Dynstat impact-strength |
|---|---|---|
| The ester-coated heavy calcium carbonate | 45,000 kg/cm$^2$ | 14.0 kg-cm/cm$^2$ |
| Stearic acid-coated heavy calcium carbonate | 46,000 | 8.0 |
| Untreated heavy calcium carbonate | 48,000 | 3.0 |

EXAMPLE 12

The physical properties of moldings obtained by incorprating polypropylene with the ester-coated magnesium hydroxide filler obtained in Example 4 (the amount coated: 5% by weight) are shown below in comparison with the case of using untreated magnesium hydroxide as control.

Table 4

| Proportion | Polypropylene Magnesium hydroxide | | 30% by weight 70% by weight |
|---|---|---|---|
| Filler | Melt index | Bending modulus | Dynstat impact-strength |
| The ester-coated magnesium hydroxide | 0.45g/ 10 min | 28,000 kg/cm$^2$ | 12 kg.cm/cm$^2$ |
| Untreated magnesium hydroxide | Not flowed | 35,000 kg/cm$^2$ | 6 kg.cm/cm$^2$ |

EXAMPLE 13

The physical properties of moldings obtained by incorporating high density polyethylene with the ester-coated aluminum hydroxide filler obtained in Example 5 (the amount coated: 2% by weight) are shown below in comparison with the case of using untreated aluminum hydroxide as control.

Table 5

| Proportion: | polyethylene Aluminum hydroxide | | 35% by weight 65% by weight |
|---|---|---|---|
| Filler | Melt index | Bending modulus | Dynstat impact-strength |
| The ester-coated aluminum hydroxide | 0.60 g/ 10 min | 27,000 kg/cm$^2$ | 16kg-cm/cm$^2$ |
| Untreated aluminum hydroxide | Not flowed | 29,500 kg/cm$^2$ | 7kg-cm/cm$^2$ |

EXAMPLE 14

The physical properties of a sheet of 0.5mm in thickness obtained by incorporating high density polyethylene with the ester-coated kaolin filler obtained in Example 6 (the amount coated: 2% by weitht) and kneadability on incorporation of the filler are shown in Table 6 in comparison with the case of using untreated kaolin.

Table 6

| Filler | Concentration of filler (% by weight) | Kneadability (roll kneading time) | Bending modulus (kg/cm$^2$) | Breakdown elongation (%) |
|---|---|---|---|---|
| The ester-coated kaolin | 50 | 10 min | 30,000 | 21 |
| " | 60 | 12 | 45,000 | 14 |
| " | 70 | 14 | 55,300 | 8 |
| Untreated kaolin | 50 | 18 | 29,600 | 8 |
| " | 60 | 22 | 39,000 | 4 |
| " | 70 | 27 | 56,000 | 3 |

EXAMPLE 15

The physical properties of a sheet of 0.5mm in thickness obtained by incorporating polypropylene with the ester-coated talc filler obtained in Example 7 (the amount coated: 2.5% by weight) are shown in Table 7 in comparison with the case of using untreated talc.

Table 7

| Filler | Concentration of filler (% by weight) | Bending modulus (kg/cm$^2$) | Breakdown elongation (%) |
|---|---|---|---|
| The ester-coated talc | 40 | 15,500 | 100 |
| " | 60 | 34,000 | 30 |
| Untreated talc | 40 | 15,000 | 70 |
| " | 60 | 35,000 | 18 |

EXAMPLE 16

The physical properties of a sheet of 0.5mm in thickness obtained by incorporating polypropylene with the ester-coated magnesium hydroxide filler obtained in Example 8 (the amount coated: 2.0% by weight) are shown in Table 8 in comparison with the case of using untreated magnesium hydroxide.

Table 8

| Coating agent for filler | Concentration of filler (% by weight) | Bending modulus (kg/cm$^2$) | Breakdown elongation (%) |
|---|---|---|---|
| Fatty acid ester | 40 | 20,000 | 95 |
| " | 60 | 35,000 | 35 |
| None | 40 | 21,000 | 75 |
| " | 60 | 36,000 | 20 |

EXAMPLE 17

Ten grams of a 10% aqueous emulsion of saturated straight fatty acid ester of pentaerythritol (main component: tetraester; chain length of the fatty acids: $C_{10}$–$C_{13}$) were sprinkled over 500g of magnesium hydroxide powder. The mixture was thoroughly stirred in a heating mixer, and dried at about 105° C. to prepare a surface-treated magnesium hydroxide powder.

The magnesium hydroxide powder thus obtained was incorporated in various proportion by Brabender plastograph into propylene-ethylene block copolymer (ethylene content: 8% by weight; melt index: 4g/10min.) and the mixture was kneaded.

On the other hand, untreated magnesium hydroxide powder for the purpose of comparison was similarly incorporated into the propylene-ethylene block copolymer and the mixture was kneaded.

The melt indexes of the compositions thus obtained were measured and are shown in Table 9.

Table 9

| Amount of magnesium hydroxide in the composition (% by weight) | Melt index (g/10 min.) | |
|---|---|---|
| | Composition containing surface treated magnesium hydroxide | Composition containing untreated magnesium hydroxide |
| 60 | 2.5 | <0.01 |
| 65 | 1.1 | <0.01 |
| 70 | 0.5 | Not kneadable |
| 75 | 0.2 | " |
| 80 | 0.1 | " |

As is evident from this table, the composition containing the surface-treated magnesium hydroxide is superior in flowing characteristics at the same level of magnesium hydroxide content to the composition containing untreated magnesium hydroxide. It is also found that the upper limit for incorporating magnesium hydroxide was extremely high.

EXAMPLE 18

Using saturated straight fatty acid ester of trimethylolpropane (main component: triester; chain length of the fatty acids: $C_{14}$–$C_{18}$) as treating agent, a surface-treated magnesium hydroxide powder was prepared in the same manner as described in Example 17. A composition comprising 65% by weight of the surface-treated magnesium hudroxide and 35% by weight of polypropylene was then prepared and kneaded in a biaxial screw extruder.

For the purpose of comparison, a composition comprising untreated magnesium hydroxide or stearic acid-treated magnesium hydroxide and polypropylene in the same proportion as described above was prepared in the same manner as described above.

The melt indexes of these compositions and impact-strength and appearance of injection molded articles manufactured from the compositions are shown in Table 10.

Table 10

| Property | Example: Product using magnesium hydroxide treated with fatty acid esters of trimethylolpropane | Comparative Example: Product using untreated magnesium hydroxide | Comparative Example: Product using magnesium hydroxide treated with stearic acid |
|---|---|---|---|
| Melt index (g/10 min.) | 2.5 | 0.30 | 0.28 |
| Impact strength (kg-cm/cm$^2$) | 23 | 8 | 11 |
| Appearance of injection molded article | Good | Silver streak formed | Silver streak formed |

As is evident from this table, the composition of the present invention is much greater in melt index than the compositions containing untreated magnesium hydroxide or stearic acid-treated magnesium hydroxide. An injection molded article manufactured from the composition of the present invention is also superior in impact strength and appearance.

EXAMPLE 19

Sixty parts by weight of magnesium hydroxide powder treated with higher fatty acid of pentaerythritol prepared in accordance with example 17 and 40 parts by weight of propyleneethylene block copolymer (ethylene content: 8% by weight; melt index: 4g/10min.) were kneaded and pelletized in a biaxial screw extruder and shaped into ⅛ inch thick test pieces by injection molding machine.

Moldability of the mixed composition was good and as to the appearance the test piece showed no defects such as silver streaks.

Then the test pieces obtained above were tested according to the flame retardant test method UL 94 of THE UNDERWRITERS LABORATORY U.S.A. and showed the evaluation: Vo, the highest self-extinguishability.

EXAMPLE 20

Fiftyfive parts by weight of magnesium hydroxide powder modified by trimethylolpropane prepared in accordance with Example 18, 45 parts by weight of polypropylene (Melt Index: 5g/10min.) and 1.5 parts by weight of carbon black were kneaded, pelletized, and shaped into test pieces of ⅛ inch thick in the same manner as described in Example 19.

Moldability of the composition as well as appearence of the test pieces were good.

On the pieces flame retardant tests were carried out in the same manner as described in Example 19 and revealed the evaluation: $V_1$, the practically sufficient self-extinguishability.

What is claimed is:

1. A resin composition of substantially improved flame retardancy and moldability comprising a thermoplastic resin having uniformly admixed therewith finely divided material in an amount at least 40% by weight of said admixture and sufficient to render said resin substantially flame retardant up to about 95% by weight of said mixture, said thermoplastic resin being present in the amount of about 60-5% by weight of said mixture, said finely divided material consisting essentially of a powdery inorganic compound coated prior to its admixture with said resin with about 0.5-5% of its weight of an ester of a polyhydric alcohol of the neopentyl series and a saturated fatty acid having about 8-18 carbon atoms.

2. A resin composition according to claim 1 wherein said thermoplastic resin is polypropylene, propylene-ethylene block copolymer or propylene-ethylene random copolymer.

3. A resin composition according to claim 2 wherein said ester is a fatty acid ester of polyhydric alcohols of the neopentyl series with straight chain fatty acid containing 8-18 carbon atoms or mixture of straight chain fatty acids containing an average of 8-18 carbon atoms.

4. A resin composition according to claim 3 wherein said polyhydric alcohol of the neopentyl series is pentaerythritol or trimethylolpropane.

5. A resin composition according to claim 4 wherein the degree of esterification of said fatty acid ester averages at least 2.

6. A resin composition according to claim 5 wherein said fatty acid ester is a complete ester.

7. A resin composition as in claim 1, wherein said powdery inorganic compound is an inorganic hydroxide.

8. The resin composition of claim 7 wherein said powdery compound is magnesium hydroxide.

9. A resin composition of claim 1, wherein said thermoplastic resin is a polyolefin resin.

* * * * *